United States Patent [19]

Podder

[11] 4,385,901
[45] May 31, 1983

[54] READILY DISPERSIBLE DYE PREPARATIONS

[75] Inventor: Nitya G. Podder, Duggingen, Switzerland

[73] Assignee: Ciba-Geigy Corporation, Ardsley, N.Y.

[21] Appl. No.: 271,866

[22] Filed: Jun. 9, 1981

[30] Foreign Application Priority Data

Jun. 12, 1980 [CH] Switzerland .................. 4537/80

[51] Int. Cl.³ .............. C09B 67/30; C09B 67/40; D06P 1/62; D06P 1/607
[52] U.S. Cl. .............................. 8/527; 8/580; 8/591; 8/904; 106/22
[58] Field of Search ............. 8/527, 591, 580, 636, 8/904; 106/22

[56] References Cited

U.S. PATENT DOCUMENTS

| | | | |
|---|---|---|---|
| 3,058,919 | 10/1962 | Haage et al. | 252/336 |
| 3,684,427 | 8/1972 | Walz et al. | 8/591 |
| 3,860,392 | 1/1975 | Renault et al. | 8/169 |
| 3,899,330 | 8/1975 | Waxman et al. | 96/3 |
| 3,977,828 | 8/1976 | Becker et al. | 8/79 |
| 4,042,320 | 8/1977 | Becker et al. | 8/39 |
| 4,076,494 | 2/1978 | Schuster et al. | 8/2.5 |
| 4,094,634 | 6/1978 | Becker et al. | 8/1 W |
| 4,110,073 | 8/1978 | Mollet et al. | 8/527 |
| 4,225,311 | 9/1980 | Niimi et al. | 8/524 |

FOREIGN PATENT DOCUMENTS 2010928 7/1979 United Kingdom .
2037819 7/1980 United Kingdom .

*Primary Examiner*—Maria Parrish Tungol
*Attorney, Agent, or Firm*—Edward McC. Roberts

[57] ABSTRACT

The readily dispersible dye preparations contain water, one or more dyes insoluble or difficultly soluble in water, a nonionic dispersing agent and optionally further additives, and as anionic dispersing agent:

(a) a dialkylsulfosuccinate, the alkyl groups of which each contain 3–7 carbon atoms, or (b) a sulfated or sulfonated fatty acid or fatty acid ester of a fatty acid having in each case 10 to 22 carbon atoms, or (c) a fatty amine-oxalkylation product of the formula

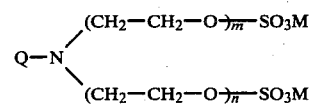

wherein Q is an aliphatic hydrocarbon radical having 12–22 carbon atoms, M is hydrogen, an alkali metal cation, ammonium cation or amine salt cation, and m and n are integers, the sum of m+n being at least 2 and at most 50.

These preparations are suitable for use in aqueous and also organic printing inks.

There are also described aqueous printing pastes which contain lignosulfonate, in addition to the anionic dispersing agents listed under (a), (b) and (c).

17 Claims, No Drawings

READILY DISPERSIBLE DYE PREPARATIONS

The invention relates to novel, readily dispersible, aqueous dye preparations of dyes insoluble or difficultly soluble in water, to a process for producing these dye preparations, to their use for preparing printing inks, to the printing inks and to their use for printing carrier materials for transfer printing.

It is known from the German Offenlegungsschrift No. 2,520,527 that storage-stable liquid dye preparations having a high concentration of dye can be produced by using selected anionic dispersing agents together with nonionic dispersing agents and hydrotropic agents, in particular urea.

The use of hydrotropic agents has however in many cases disadvantages. Preparations which contain ionic hydrotropic agents cannot, on account of too high an electrolyte content, be used in media sensitive to electrolytes, for example in those containing polyacrylate thickeners. Preparations having urea as the hydrotropic agent undergo during prolonged storage a change of pH value as a result of ammonia being split off, a process which in the case of dyes sensitive to alkalies can lead to partial decomposition. Furthermore, electrolyte is additionally formed by virtue of ammonia being split off. In the case of many thickeners, there is also the risk in the presence of urea of them turning brown or hardening, with the result that they are difficult to wash out. The formation of ammonia in the hermetically sealed vessels in which the preparations are stored can moreover lead to a dangerous excess pressure being generated.

And from the German Offenlegungsschrift No. 2,850,482 are known aqueous dye preparations having a low content of dispersing agents, which preparations contain anion-active dispersing agents and specific non-ionic dispersing agents but no urea or similar hydrotropic agents.

All these dye preparations are however only to a limited extent suitable for preparing printing inks for printing paper for transfer printing, which inks consist largely of organic solvents, since flocculation and/or agglomeration or precipitation occur when these preparations are used. The use of papers printed with such printing inks in transfer printing results in printed textile material which exhibits speckles and is hence unusable.

It was the object of the present invention to provide aqueous dye preparations which would have a low content of dispersing agents and which could be used fully satisfactorily both in aqueous and in organic printing inks for transfer printing, without spots or specks appearing on the textile material. This objective has been achieved with the dye preparations according to the invention. Furthermore, the redispersibility compared with that of known preparations is surprisingly clearly improved.

The present invention relates to readily dispersible dye preparations containing water, one or more dyes insoluble or difficultly soluble in water, an anionic and a nonionic dispersing agent and optionally further additives, which preparations contain as anionic dispersing agent:

(a) a dialkylsulfosuccinate, the alkyl groups of which each contain 3–7 carbon atoms, or (b) a sulfated or sulfonated fatty acid or fatty acid ester of a fatty acid having in each case 10 to 22 carbon atoms, or (c) a fatty amine-oxalkylation product of the formula

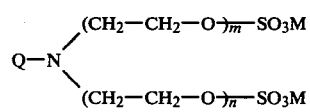

wherein

Q is an aliphatic hydrocarbon radical having 12–22 C atoms,

M is hydrogen, an alkali metal cation, ammonium cation or amine salt cation, and m and n are integers, the sum of m+n being at least 2 and at most 50.

Suitable dyes insoluble or difficultly soluble in water are in particular disperse dyes and vat dyes. They are dyes belonging to various classes; the disperse dyes are for example: nitro dyes, aminoketone dyes, ketonimine dyes, methine dyes, nitrodiphenylamine dyes, quinoline dyes, aminonaphthoquinone dyes or coumarin dyes, and especially anthraquinone dyes and azo dyes, such as monoazo and disazo dyes.

Vat dyes which can be used are for example indigoid dyes, anthraquinoid dyes, for example indanthrene dyes, and also sulfur dyes and leuco vat dye esters.

By dyes are also meant optical brighteners. These are for example brighteners which are insoluble to difficultly soluble in water and which belong to the following classes of compounds: stilbenes, coumarins, benzocoumarins, pyrenes, pyrazines, pyrazolines, oxazines, mono- or dibenzoxazolyl or -imidazolyl compounds, aryltriazole and v-triazole derivatives as well as naphthalic acid imides.

It is clear that the type of dye is largely determined by the shade of colour desired and by the field of application of the aqueous dye preparations according to the invention. When they are to be used for example to prepare printing inks with further use in transfer printing, the employed dyes insoluble or difficultly soluble in water will be those which are suitable for the transfer-printing process, especially disperse dyes which convert to the vapour state between 150° and 220° C. to the extent of 60% in less than 60 seconds at atmospheric pressure, which are stable to heat and which are transferable without undergoing decomposition.

It is also possible to use mixtures of identical or different types of dyes and of optical brighteners, within the defined limits, in the aqueous preparations. The preparations according to the invention preferably contain 35–50 percent by weight of dye or of optical brightener.

Suitable anion-active dispersing agents for the preparations according to the invention are:

(a) dialkylsulfosuccinates, the alkyl groups of which each contain 3–7 carbon atoms, for example di-n-propylsulfosuccinate, di-iso-propylsulfosuccinate, di-iso-butylsulfosuccinate, di-heptylsulfosuccinate, preferably however di-hexylsulfosuccinate and di-amylsulfosuccinate; also mentioned are the following sulfosuccinates: alkylethoxysulfosuccinate, fatty alcohol-ether-sulfosuccinate, fatty alcohol-sulfosuccinate and fatty acid-alkylolamidosulfosuccinate;

(b) sulfated or sulfonated fatty acids or fatty acid esters of fatty acids having in each case 10 to 22, preferably 12–18, carbon atoms, for example sulfated oleic acid, elaidic acid or ricinoleic acid or lower alkyl esters thereof, for example ethyl, propyl or butyl ester; also very suitable are the sulfated or sulfonated oils which contain such fatty acids, such as olive oil, rape oil and in particular castor oil;

(c) fatty amine-oxalkylation products of the formula

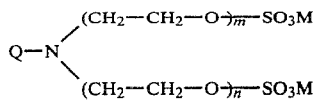

wherein

Q is an aliphatic hydrocarbon radical having 12–22, preferably 14–22, C atoms,

M hydrogen, an alkali metal cation, ammonium cation or amine salt cation, and m and n are integers, the sum of m+n being at least 2 and at most 50, preferably at least 2 and at most 30, and especially at least 4 and at most 12.

M denotes as an alkali metal ion in particular the sodium or potassium ion, and as an amine salt ion the ion of a mono-, di- or trialkanolamine. M is preferably the ammonium ion.

The fatty amine-oxalkylation products are produced in a manner known per se by adding, by an addition reaction, 2 to 50 mols of ethylene oxide to an aliphatic amine which contains an aliphatic hydrocarbon radical having 12 to 22 carbon atoms, and then converting the addition product with sulfuric acid, or with a functional derivative thereof, into the ester, and optionally converting the ester obtained into one of the salts mentioned above. Functional derivatives of sulfuric acid are for example halides, esters and amides, such as chlorosulfonic acid and especially sulfamic acid.

The radical Q need not have a quite specific number of carbon atoms, but can be a mixture of hydrocarbon chains of varying length, such as is the case for instance with many fatty amines which are derived from natural fats.

It is also possible to use mixtures of various fatty amine-oxalkylation products of the above formula.

Particularly preferred is the ammonium salt of the reaction product of 1 mol of tallow fatty amine with 6 to 8 mols of ethylene oxide.

Mixtures of the aforementioned anionic dispersing agents can also be used, for example mixtures containing a dialkylsulfosuccinate and/or a sulfated or sulfonated fatty acid, or an ester thereof, and/or a fatty amine-oxalkylation product. There can also be used mixtures containing one or more of the stated anionic dispersing agents (a), (b) and/or (c), as well as further anionic dispersing agents, for example condensation products of crude cresol, formaldehyde and naphthalenesulfonic acid, polyphosphates or preferably lignosulfonates. Lignosulfonates are used in combination with the anionic dispersing agents listed under (a), (b) and (c) for producing aqueous printing pastes which are particularly suitable for light-shade printing on polyester with subsequent HT fixation or thermosol fixation.

These anionic dispersing agents are preferably used in the form of the ammonium, amine or in particular alkali metal salts, such as lithium, potassium or especially sodium salts, the amounts being between 0.5 and 5 percent by weight, preferably between 1 and 3 percent by weight, relative to the total weight of the preparation.

Suitable nonionic dispersing agents are for example:

addition products of for example 5 to 50 mols of alkylene oxides, particularly ethylene oxide, where individual ethylene oxide units can be replaced by substituted epoxides, such as styrene oxide and/or propylene oxide, with higher fatty acids or with saturated or unsaturated alcohols, mercaptans or amines having 8 to 20 carbon atoms, or with alkylphenols or alkylthiophenols, the alkyl groups of which each contain at least 7 carbon atoms;

reaction products of higher molecular fatty acids and hydroxyalkylamines, which can be produced for example from higher molecular fatty acids, preferably those having about 8 to 20 carbon atoms, for example caprylic acid, stearic acid, oleic acid and in particular the acid mixture embraced by the collective name of "coconut oil fatty acid", and hydroxyalkylamines, such as triethanolamine or preferably diethanolamine, as well as mixtures of these amines, the reaction being performed with the molar ratio between hydroxyalkylamine and fatty acid having a value greater than 1, for example 2:1: compounds of this type are described in the U.S. Pat. No. 2,089,212;

phenol ethers, such as p-nonylphenol, etherified with 9 mols of ethylene oxide, ricinoleic acid esters having 15 mols of ethylene oxide, and hydroabietyl alcohol etherified with 25 mols of ethylene oxide.

Fatty alcohol polyglycol ethers have proved particularly advantageous, especially those having 20–100 mols of ethylene oxide, such as stearyl-oleyl alcohol, etherified with 80 mols of ethylene oxide, and oleyl alcohol, etherified with 20 to 80 mols of ethylene oxide, in particular however cetyl-stearyl alcohol etherified with 20–30 mols of ethylene oxide.

Likewise preferred are alkylene oxide, particularly ethylene oxide, condensation products, where individual ethylene oxide units can be replaced by substituted epoxides, such as styrene oxide and/or preferably propylene oxide.

Particularly preferred are the copolymers of ethylene oxide and propylene oxide of the formula

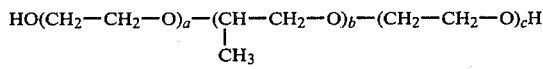

wherein the sum of a and c is a number between 200 and 400, and b is a number between 30 and 80.

These nonionic dispersing agents advantageously have a low electrolyte content. Mixtures of dispersing agents of this type are possible.

The nonionic dispersing agents are used in amounts of 0.5–4 percent by weight, preferably 1–3 percent by weight relative to the total weight of the preparation.

It is in general advantageous when the total amount of anionic and nonionic dispersing agents is 1–6 percent by weight, preferably 2–4 percent by weight, the required amount varying to a small extent, depending on the nature of the crude dye.

There can be added to the dye preparations if desired further additives for improving properties, for example moisture-retaining agents and anti-freezing agents, for example the polyols, ethylene glycol, monopropylene glycol, diethylene glycol, dipropylene glycol, tri- or polyethylene glycol, glycerin, sorbitan, and so forth, or formamide, the moisture-retaining agent and antifreezing agent being able to be used as such or in combination with a second moisture-retaining and/or antifreezing agent; also antimicrobics; fungicides, for example aqueous formalin solution or chloroacetamide; antifoam agents and agents improving viscosity, for example polysaccharides.

Preparations which have proved to be particularly stable in storage are those containing at least 20 percent by weight of water, 25 to 60, especially 35 to 50, percent by weight of a finely dispersed disperse dye, 1 to 3 percent by weight of an anionic dispersing agent as defined, 1 to 3 percent by weight of a nonionic dispersing agent, as well as optionally further additives.

The novel aqueous dye preparations are produced for example by mixing and grinding, for example in a ball mill or sand mill, the defined dye in water with at least one anion-active dispersing agent and/or nonionic dispersing agent as defined, and adding, before, during or after the grinding operation, the other constituents, so that there is obtained a preparation of which the particle size is below 10 μm, especially below 2 μm.

Since the preparations according to the invention have a low electrolyte content, it is possible to use, for the production of printing pastes, thickeners which are sensitive to electrolytes. Thickeners which have proved particularly valuable in this connection are those having a polyacrylic base.

The novel dye preparations are thinly liquid dispersions which have a low content of dispersing agents and of electrolytes, which have a fine dispersion of constituents, are stable to dispersion, that is to say, do not form aggregates, and have a high concentration of dye. They remain stable both during prolonged storage at 25° to 30° C. and during several weeks of storage at 60° C.; the preparations are of low viscosity, fully satisfactorily filterable, and undergo negligible change of viscosity. The fine distribution of the dyes remains virtually unchanged during storage. The novel preparations can be dispersed in textile printing pastes containing all conventional thickeners to give printings free from flecks. They are excellently suitable for direct printing on synthetic textile material, for example that made from polyesters.

When the preparations according to the invention are used in aqueous printing inks or printing pastes, the viscosity thereof can be raised to the desired value by the addition of 0.1-1% of carboxymethylcellulose (Na salt).

A really important advantage of the novel preparations is that they can be used for the preparation of printing inks having an organic base. Printing inks having an organic base are for example those consisting of about 80% of a mixture of n-propanol and iso-propanol, about 10% of water and about 10% of CAP (cellulose acetopropionate). The preparations according to the invention can be dispersed in these printing inks fully satisfactorily without any precipitation occurring, and transfer printing paper printed with these printing inks yields perfect printings free from specks.

In addition, the novel aqueous dye preparations can be used for the preparation of aqueous or aqueous-organic dye liquors or printing inks or those based on a water-in-oil emulsion.

The printing inks are suitable for dyeing or printing organic material, especially synthetic textile materials, by continuous or discontinuous processes, for example materials made from cellulose triacetate, synthetic polyamides and in particular polyester. The dyeings can be obtained by dyeing, padding or printing processes, whereby the additives customarily used for application of disperse dyes to synthetic material are employed.

The materials can be in the most varied stages of processing.

In the continuous dyeing of mixed fabrics made from polyester and cellulose material, there are customarily used, in the single-bath/single stage process, disperse dyes for the polyester constituent and, inter alia, reactive dyes for the cellulose constituent. There occur in this process, as is known, undesirable reactions between anionic dispersing agents in the disperse dye and the reactive dye, and these reactions lead to a considerable reduction in the yield in the case of the reactive dyeings, and hence to problems with respect to reproducibility of the dyeings and also with respect to increased contamination of the waste liquors.

When, however, disperse-dye formulations according to the present invention are used, the described disadvantages are completely or for the most part overcome.

The dye preparations according to the invention can be used in particular for printing sheet materials by the transfer-printing process.

The transfer-printing process is generally known and is for example described in detail in the French Patent Specifications Nos. 1,223,330, 1,334,829 and 1,585,119. In this process, so-called auxiliary carriers, which have been printed with suitable printing inks, are brought into close contact with the substrate to be printed, whereupon the dye suitable for transfer printing is transferred, by the action of heat and, if necessary, of pressure, from the carrier to the substrate.

Auxiliary carriers which can be used are sheet materials which are stable to heat and dimensionally stable, advantageously having a smooth surface of paper, cellophane, sheet metal, and so forth (cp. British Patent Specification No. 1,190,889). The preferred material is paper.

The transfer is effected in the usual manner by the action of heat. The treated carrier materials are brought into contact with the textile materials to be printed, and are held at about 120° to 210° C. until the dyes (as defined) applied to the carrier material are transferred to the textile material. The time required for this is as a rule 5 to 60 seconds. After completion of the heat treatment, the printed material is separated from the carrier. The material requires no aftertreatment, neither a steam treatment to fix the dye, nor a washing treatment to improve fastness properties.

Suitable transfer-printing substrates are preferably materials in sheet form, such as fleeces, felts, carpets and, in particular, fabrics and knitted goods made from synthetic fibres.

When the novel preparations contain optical brighteners, they can be used for the optical brightening of textile materials, for example using the exhaust process, high-temperature exhaust process and padding-thermosol process. Further suitable dispersing agents or other auxiliaries can if necessary be added for stabilising the liquor and/or for obtaining carrier effects.

The Examples which follow further illustrate the invention without limiting its scope. The term 'parts' denotes parts by weight, percentages are percent by weight, and the temperature values are in degrees Centigrade.

EXAMPLE 1

A. Production of the preparation 480 parts of the disperse dye of the formula

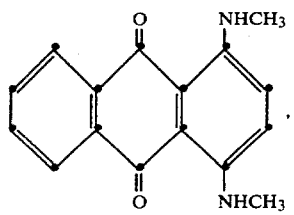

in the form of the dried crude dye largely purified of electrolytes, are stirred up in a dispersion medium consisting of:
- 303 parts of water,
- 170 parts of 1,2-propylene glycol,
- 10 parts of formalin,
- 2 parts of an antifoam agent (1:10 dilution with water),
- 10 parts of sodium diamylsulfosuccinate, and
- 25 parts of a nonionic polycondensation product consisting of 20% of propylene oxide and 80% of polyethylene oxide having a molecular weight of about 16,500.

The dispersion is ground in a stirrer-mill by means of zirconium oxide grinding elements until the mean primary particle size of the dye is 2 μm. The ground material is separated from the grinding elements and deaerated. There is thus obtained a dye preparation which is thinly liquid, which can be filtered, and which retains its stability, particularly its degree of dispersion, with only an insignificant change even after being stored for several weeks at 60° or for several months at varying room temperatures.

The same result is obtained when the dispersion is ground in a glass-ball mill, sand mill or "Dynomühle".

B. Preparation of the printing ink

I. Organic printing ink 21 parts of the preparation obtained and 79 parts of a CAP stock thickener, consisting of a mixture of n-propanol, isopropanol, water and cellulose acetopropionate (CAP) in the ratio of 41:41:10:8, are mixed together in a stirring apparatus until a homogeneous mixture is obtained. This printing ink is applied to paper by means of a gravure printing device.

II. Aqueous printing ink 6 parts of the dye preparation obtained are mixed with
94 parts of the stock thickener, consisting of an 8% aqueous starch-ether solution, water, a 12.5% aqueous solution of an emulsifier for oil-in-water emulsions (fatty alcohol ethylene oxide adduct), white spirit and a fungicide in the ratio of 50:43.5:1:5:0.5.

The printing ink is applied to paper by the flat screen printing process.

The papers printed with use of the organic or aqueous printing inks described above are suitable for printing textile materials, for example those made from polyester, in the transfer-printing process. Level, sharply outlined, speck-free printings having a high colour intensity are obtained.

EXAMPLE 2

500 parts of the disperse dye of the formula

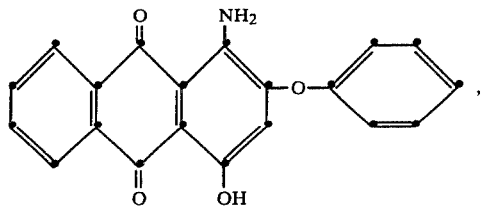

in the form of dried crude dye largely freed from electrolytes, are stirred up in a dispersion medium consisting of
- 303 parts of water,
- 150 parts of 1,2-propylene glycol,
- 10 parts of formalin,
- 2 parts of antifoam agent (1:10 dilution with water),
- 10 parts of Na diamylsulfosuccinate, and
- 25 parts of the polycondensation product described in Example 1.

The dispersion is ground in the manner described in Example 1, and a dye preparation having the properties mentioned in Example 1 is obtained.

EXAMPLE 3

500 parts of the disperse dye of the formula

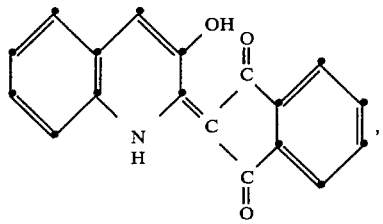

in the form of dried crude dye largely purified from electrolytes, are stirred up in a dispersion medium consisting of:
- 273 parts of water,
- 170 parts of 1,2-propylene glycol,
- 10 parts of formalin,
- 2 parts of an antifoam agent (1:10 dilution with water),
- 10 parts of Na diamylsulfosuccinate, and
- 35 parts of the nonionic polycondensation product mentioned in Example 1.

The dispersion is ground in the manner described in Example 1 to thus obtain a dye preparation having the properties of that described in Example 1.

EXAMPLE 4

500 parts of the disperse dye of the formula

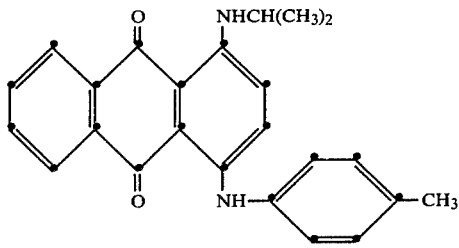

in the form of press cake (moisture content 40%) are stirred up in a dispersion medium consisting of 234 parts of water
50 parts of 1,2-propylene glycol,
10 parts of formalin,
2 parts of an antifoam agent (1:10 dilution with water),
10 parts of Na-diamylsulfosuccinate, and
30 parts of the nonionic polycondensation product given in Example 1.

There is then added during 30 minutes a solution of 12 parts of a resin consisting of a condensation product of formaldehyde and cyclohexanone having a molecular weight of about 2000 in
150 parts of 1,2-propylene glycol.

The dispersion is ground in a stirrer-mill by means of zirconium oxide grinding elements until the mean primary particle size of the dye is 2 μm. The ground material is separated from the grinding elements and deaerated. The dispersion has a viscosity of 110 cP (Brookfield-Viscosimeter, spindle 4, 50 r.p.m.). The viscosity is raised to a value of 520 cP by the addition of 0.2% of a polysaccharide and several hours of stirring. There is thus obtained a dye preparation which is thinly liquid, which can be readily filtered, and which retains its viscosity and degree of dispersion with only an insignificant variation even after storage for several weeks at 60° or for several months at varying room temperatures.

The same result is obtained when the dispersion is ground in a glass-ball mill, sand mill or "Dynomühle".

In the manner described in Example 1, there is produced with this preparation an organic or aqueous printing ink with which there is printed paper which is used in transfer printing. The printings obtained are level and free from specks.

EXAMPLE 5

Level and speck-free printings are likewise obtained when the sodium diamylsulfosuccinate in Examples 1–4 is replaced by identical amounts of sodium dihexylsulfosuccinate or a fatty acid sulfonate having 12 to 16 carbon atoms.

EXAMPLE 6

By replacing in Examples 1–5 the nonionic polycondensation product with identical amounts of cetyl/stearyl alcohol etherified with 25 mols of ethylene oxide, there are likewise obtained level printings free from specks.

EXAMPLE 7

(Comparative Example)

When the sodium diamylsulfosuccinate in Examples 1–4 is replaced by identical amounts of lignin sulfonate, there are obtained, with use of the described organic printing ink, printings which clearly show specks.

EXAMPLE 8

(Comparative Example)

When the sodium diamylsulfosuccinate in Examples 1–4 is replaced by identical amounts of water, the dispersions become very highly viscous during grinding, especially in a 'Dyno-Mühle' (dynomill), and are difficult to grind. When the resulting organic printing ink is used, the printings obtained show clear specks. Furthermore, agglomerates form in this organic printing ink.

EXAMPLE 9

When the sodium diamylsulfosuccinate is replaced in Examples 1–4 by identical amounts of the fatty amine-oxalkylation product of the formula

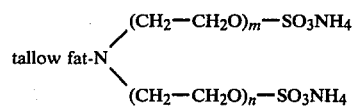

wherein $m+n$ is 8, these are likewise obtained level dyeings free from specks.

EXAMPLE 10

440 parts of the disperse dye of the formula

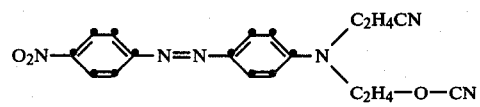

in the form of the crude dye, which has been largely purified of electrolytes, dried at 100° and then ground dry in a dowelled disc mill, are stirred up in a dispersion medium consisting of 278 parts of water,
200 parts of 1,2-propylene glycol,
10 parts of formalin,
30 parts of a nonionic polycondensation product consisting of 20% of propylene oxide and 80% of ethylene oxide, having a molecular weight of about 16,500,
20 parts of a tallow fat amine-oxalkylation product of the formula

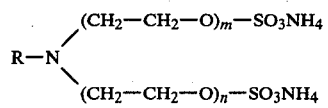

R = hydrocarbon radical of the tallow fat amine
$m+n=8$ 20 parts of the sodium salt of lignosulfonic acid, and
2 parts of an antifoam agent (1:10 dilution with water).

The dispersion is ground in a stirrer-mill by means of zirconium oxide grinding elements until the primary particle size of the dye is below 2 μm. The ground material is separated from the grinding elements and deaerated. There is thus obtained a dye preparation which is thinly liquid, which can be readily filtered, and which retains its physical stability, especially its degree of dispersion, without any significant change even after several weeks of storage at 60° or after being stored for several months at varying room temperatures.

The same result is obtained when the dispersion is ground in a glass-ball mill, sand mill or 'Dynomühle'.

EXAMPLE 11

440 parts of the disperse dye of the formula

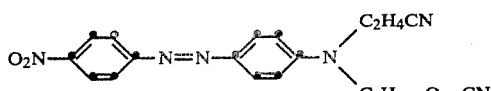

in the form of the crude dye, which has been largely purified of electrolytes, dried at 100° and then ground dry in a dowelled disc mill, are stirred up in a dispersion medium consisting of 278 parts of water,
200 parts of 1,2-propylene glycol,
10 parts of formalin,
30 parts of a nonionic polycondensation product consisting of 20% of propylene oxide and 80% of ethylene oxide, having a molecular weight of about 16,500,
20 parts of the sodium salt of lignosulfonic acid,
20 parts of sodium diamylsulfosuccinate, and
2 parts of an antifoam agent (1:10 dilution with water).

The mixture is subsequently deaerated, and the deaerated dispersion is ground in a stirrer-mill by means of zirconium oxide grinding elements until the primary particle size of below 2 μm. The ground material is separated from the grinding elements. The dye preparation obtained is thinly liquid, can be readily filtered, and retains its physical stability, particularly its degree of dispersion, even after several weeks of storage at 60° or after several months at varying room temperatures without any significant change occurring.

EXAMPLE 12a

Printing instruction for full-shade printing 15 parts of the dye preparation obtained according to Example 10 or 11 are stirred up and well homogenised in 985 parts of a 3.5% solution of a high- as well as low-molecular polyacrylic acid (in the ratio of 2.5:1) in distilled water, the pH-value of the solution having been adjusted to 6.8–7.1 with sodium hydroxide solution. The viscosity of the aforementioned neutral solution of polyacrylic acid is between 22,000 and 25,000 cP (Brookfield Viscosimeter RVT, spindle 4, 60 min. at 20° C.).

A polyester fabric is printed with this printing paste in a rotary intaglio printing machine (roller printing). Drying is subsequently performed at 100°–140°, and the printed fabric is fixed in high-temperature steam at 180° for 8 minutes. Instead of using this so-called HTS-fixing method, it is also possible to apply dry-fixing (thermosol fixation) for one minute at 200°–210°. The material is ready for use after the fixing operation. The polyester printings obtained have a soft handle, are of high brilliance and have optimum depth of colour. The degree of fixation of the orange dye is over 99%. An afterwashing of the printed and fixed fabric is therefore not necessary since the handle obtained and also the fastness properties fully meet the demands made in practice.

EXAMPLE 12b

Printing instruction for light-shade printing

For light-shade printing, a portion of the printing paste described in Example 12A is mixed with 29 parts of the above-stated polyacrylic acid neutralised with sodium hydroxide solution. The printing paste thus obtained is used in a printing process according to Example 12A.

EXAMPLE 13

(Comparative Example)

When the fatty amine-oxalkylation product and the sodium diamylsulfosuccinate in Examples 10 and 11, respectively, are replaced by the same amount of lignosulfonate, there are obtained, with use of the described aqueous printing paste in the case of light shades, printings which clearly exhibit speckles.

EXAMPLE 14

500 parts of the dried yellow vat dye of the formula

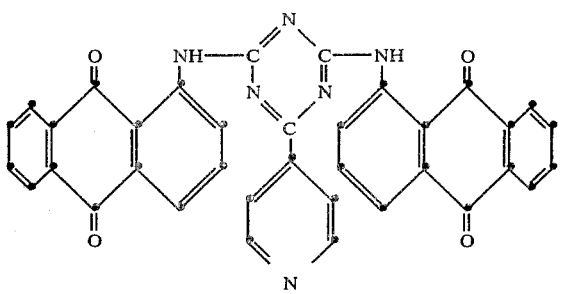

are stirred into a solution containing
300 parts of water,
150 parts of glycerin,
30 parts of a nonionic polycondensation product consisting of 20% of propylene oxide and 80% of ethylene oxide, having a molecular weight of about 16,500, and
20 parts of sodium diamylsulfosuccinate, and the liquid slurry is ground, in a stirrer-mill with 1 mm glass-beads, down to a primary particle size which for the major part is considerably below 2 μm, only isolated particles being above 5 μm. The dispersion after being separated from the grinding elements and then deaerated is liquid, and even after 14 days of storage at 60° the viscosity and filterability of the dispersion remain unchanged.

When this preparation is stirred in the customary manner into aqueous textile-printing thickenings, and cellulose fibres are subsequently printed with the resulting printing paste, the printing obtained is free from specks.

When the sodium diamylsulfosuccinate in the above Example is replaced by identical amounts of sodium dihexylsulfosuccinate, a fatty acid sulfonate having 12–16 carbon atoms, or the fatty amine-oxalkylation product given in Example 9, there are obtained preparations having similar properties.

What is claimed is:

1. A readily-dispersible, storage-stable, concentrated, dye composition, substantially devoid of hydrotropic agents and containing water, one or more dyes insoluble or difficulty soluble in water, a nonionic dispersing agent and an anionic dispersing agent selected from the group consisting of
   (a) dialkylsulfosuccinates, the alkyl groups of which each contain 3–7 carbon aoms,
   (b) sulfated or sulfonated fatty acids and esters thereof of 10 to 22 carbon atoms, and
   (c) fatty amine-oxalkylation products of the formula

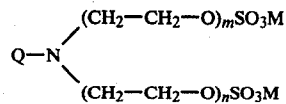

wherein
Q is an aliphatic hydrocarbon radical having 12-22 carbon atoms,
M is hydrogen, an alkali metal cation, ammonium cation or amine salt cation, and
m and n are integers, the sum of m+n being at least 2 and at most 50.

2. A dye composition of claim 1, which contains the anionic dispersing agent in an amount of 0.5 to 5 percent by weight relative to the total weight of the preparation.

3. A dye composition of claim 1, which contains the anionic dispersing agent in an amount of 1 to 3 percent by weight relative to the total weight of the preparation.

4. A dye composition of claim 1, wherein the dialkylsulfosuccinates have alkyl groups of 4-6 carbon atoms; the sulfated or sulfonated fatty acids and esters have 12 to 18 carbon atoms; and in the fatty amine-oxalkylation products Q has 14-22 carbon atoms, and the sum of m+n is at least 4 and at most 12.

5. A dye composition of claim 4, wherein the anionic dispersing agent is di-hexylsulfosuccinate or di-amylsulfosuccinate.

6. A dye composition of claim 1, which contains the nonionic dispersing agent in an amount of 0.5-4 percent by weight relative to the total weight of the preparation.

7. A dye composition of claim 1, which contains the nonionic dispersing agent in an amount of 1 to 3 percent by weight relative to the total weight of the preparation.

8. A dye composition of claim 1, wherein the nonionic dispersing agent is fatty alcohol polyglycol ether having 20-100 mols of ethylene oxide, polyethylene oxide condensate or polyethylene oxide/propylene oxide condensate.

9. A dye composition of claim 8, wherein the nonionic dispersing agent is cetyl-stearyl alcohol etherified with 20-30 mols of ethylene oxide or ethylene oxide/propylene oxide of the formula

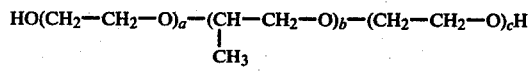

wherein the sum of a and c is a number between 200 and 400, and b is a number between 30 and 80.

10. A dye composition of claim 1 containing at least 20 percent by weight of water, 25-60 percent by weight of the finely dispersed disperse dye, 1-3 percent by weight of the anionic dispersing agent and 1-3 percent by weight of the nonionic dispersing agent.

11. A dye composition of claim 10, wherein the disperse dye content is 35-50 percent by weight.

12. A dye composition of claim 1, further containing a moisture-retaining agent, an antifreeze agent, an antimicrobial, a fungicides, an antifoam agent or an agent improving viscosity.

13. A process for producing an aqueous dye composition of claim 1, which process comprises grinding the dye in water with at least one of the anionic dispersing agent or the nonionic dispersing agent, until the dye has a particle size of less than 10 $\mu$m. particularly smaller that 2 $\mu$m.

14. A process of claim 13, wherein the dye is ground to a particle size of less than 2 $\mu$m.

15. A method of making a printing ink, comprising the step of mixing a composition of claim 1 with a thickening agent.

16. A method of claim 15 wherein the thickening agent contains carboxymethylcellulose or cellulose acetopropionate.

17. A printing ink produced by the method of claim 15 or claim 16.

* * * * *